W. H. GLEESON.
AUTOMATIC PRESSURE REDUCING VALVE.
APPLICATION FILED NOV. 12, 1913.
1,147,937.
Patented July 27, 1915.
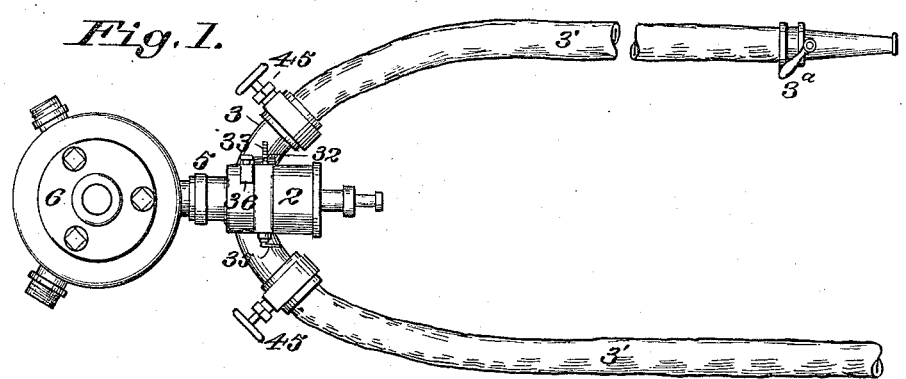
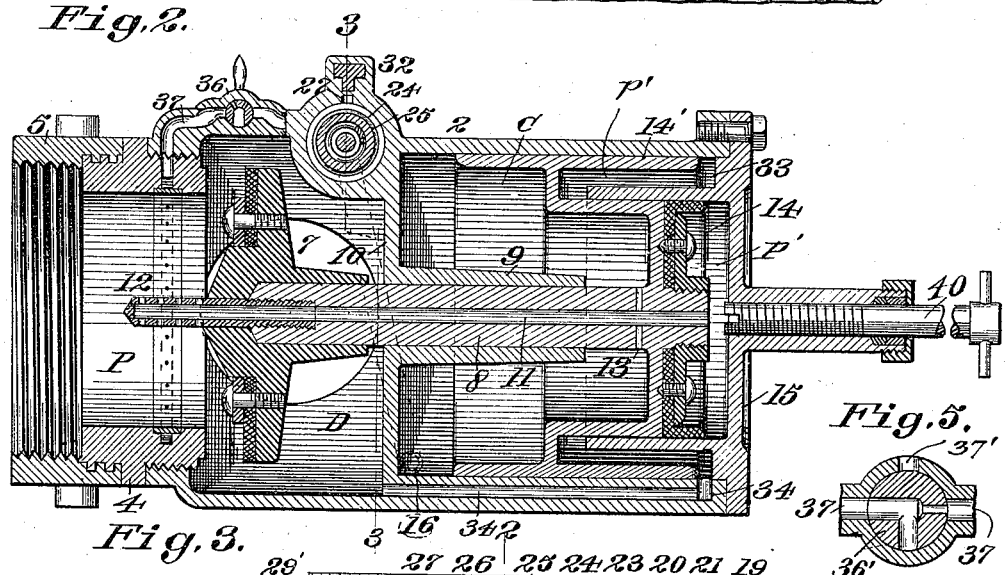
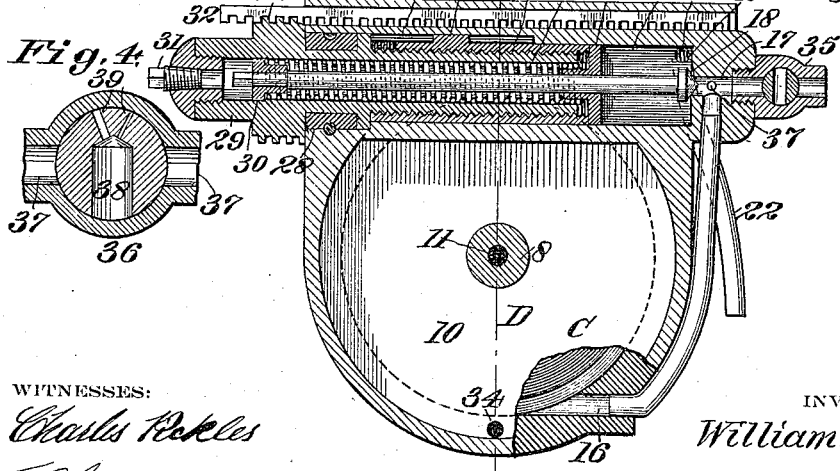
WITNESSES:
INVENTOR
William H. Gleeson

UNITED STATES PATENT OFFICE.

WILLIAM H. GLEESON, OF SAN FRANCISCO, CALIFORNIA.

AUTOMATIC PRESSURE-REDUCING VALVE.

1,147,937. Specification of Letters Patent. Patented July 27, 1915.

Application filed November 12, 1913. Serial No. 800,538.

*To all whom it may concern:*

Be it known that I, WILLIAM H. GLEESON, a citizen of the United States, residing in the city and county of San Francisco and State of California, have invented new and useful Improvements in Automatic Pressure-Reducing Valves, of which the following is a specification.

This invention relates to an automatic pressure reducing valve.

It is the object of the present invention to provide an automatically operating valve whereby any degree of pressure between the maximum high pressure of a service system and the low minimum pressure can be readily obtained and maintained, the valve operating automatically to maintain the arbitrary fixed pressure on the discharge side; and it is a further object of the present invention to provide manually operable means whereby the valve may be quickly adjusted to deliver maximum pressure from the high pressure service, or to quickly close down the valve irrespective of the automatic means for maintaining the arbitrary pressure from the valve.

A further object of the present invention is to provide a valve with automatically operable and manually adjustable means for maintaining an arbitrary pressure at or below the maximum at the discharge side of the valve, said means including an index adjustable to indicate the desired arbitrary selectable pressure; and it is a further object of the invention to provide a Siamese automatically operable pressure control valve.

It is another object of the present invention to provide means for automatically regulating the discharge pressure of the valve, and to provide a manually operable safety controlling cock for use to open the valve in the event of the non-operation of the automatic mechanism of the valve, said safety cock being designed for reversing, so that it may be cleaned of accumulated deposits by the high pressure of liquid flowing there-through.

The invention consists of a valve casing or body comprehending a pressure chamber connectible with the high pressure service system, and an arbitrarily fixed constant pressure or controlling chamber communicating with the high pressure chamber and having an automatically operable throttle, and a discharge chamber which may have a plurality of discharge ports, and a valve disk operable in the discharge chamber and adapted to control the flow of fluid from the pressure chamber there-through; the movement of the valve disk being controlled by variations of pressure as between the discharge chamber and the arbitrarily fixed constant pressure control chamber.

The invention further consists of details of construction and combination of parts which will be hereinafter set forth.

Figure 1 is a plan view of the invention. Fig. 2 is a vertical section on the line 2—2 of Fig. 3. Fig. 3 is a cross section through the valve on the line 3—3 of Fig. 2. Fig. 4 is a detail of the reversible, opening cock. Fig. 5 is a detail of a varied form of the manually operable valve for controlling communication between the high pressure chamber and the controlling chamber and the atmosphere.

My present invention comprises a valve body or casing, indicated generally at 2, and includes a discharge chamber D with Siamese discharge connections 3, one end of the discharge chamber D being provided with a removable valve seat 4, swiveling upon which is a coupler 5 whereby the valve may be coupled to a suitable source of supply, here indicated at a hydrant 6, which may be a part of a high pressure water system.

For the purposes of this invention the chamber within the valve seat 4 will be designated the high pressure chamber P, deriving fluid under maximum pressure from the source of supply 6, and the fluid will discharge into the discharge chamber D when a valve disk 7 lifts from the valve seat 4.

The valve disk 7 is shown as provided with a tubular valve stem 8, slidably mounted in a bearing or guide 9 projecting from a transverse wall 10 on the side opposite to the discharge chamber D, over which there is formed a chamber C in which the fluid is maintained at an arbitrary fixed pressure by means as later described. The constant pressure chamber C communicates through a duct 11 of the tubular valve stem 8 with the high pressure chamber, the duct being continued from the valve stem into a screen and guard 12 mounted on the face of the valve disk 7; water being conducted from the duct 11 of the valve stem through transverse ports 13 adjacent to the rear end of the valve stem 8.

Formed upon, or attached to the rear end of the valve stem 8, there is a piston 14 which is of substantially equal area with the diameter of the high pressure chamber P in the valve seat 4, and the duct 11 of the valve stem is continued throughout the length of the latter and discharges into a pressure chamber P' under the valve cap 15, so that the pressures of fluid in the chambers P and P' are constantly equal, and are that of the pressure at the source of supply 6 to which the valve is connected. Therefore, the valve disk 7 is substantially unaffected by the direct pressure in the chamber P, because of the balancing effect of the same pressure in the chamber P' under the cap 15 of the valve. While the outer face of the piston 14 of the valve is subjected to high pressure in the chamber P', it is subject on the opposite face to the pressure existing in the control chamber C.

The pressure in the control chamber C, which is originally derived from the fluid coming from the high pressure chamber P through the ducts 11 and 13 may be arbitrarily varied and constantly maintained through an automatically operable throttle associated with the control chamber C as follows: From the lower portion of the control chamber there extends a passageway or duct 16, Fig. 3 which communicates with a bypass chamber 17 formed in the body 2 of the valve; and one side of which is provided with a valve seat 18, upon which may seat a valve 19 movable in a pocket 20, which has a port 21 at one side connected to which is a drain discharge or drip pipe, or conductor, 22, extended downwardly over one side of the valve body so as to discharge the spent liquid free from the valve body. The valve 19 is shown as comprising a spindle extending loosely through a bushing 23, to which is attached a spring 24, inclosed in a hollow screw 25, upon which the bushing 23 is externally threaded, the latter having a shoulder or key 26 slidable in a key-way or groove 27, the screw 25 being turnably supported in a bearing or journal part 28 of the casing 2 and having a polygonal or otherwise formed head 29 whereby it may be revolved in its bearing.

The outer end of the spring 24 is connected to a collar 30, which bears against the adjacent end of the spindle valve 19, the tension of the spring being variable by the turning of the screw 25 which causes the bushing 23 to change its position in the spring chamber or pocket 20, thus increasing or decreasing the tension of the spring 24 and consequently the pressure with which the spindle valve is held against its seat 18. While any suitable means or type of spring may be utilized for yieldably seating the spindle valve, I prefer to employ the tension spring 24, for the reason that it normally clears the surrounding wall of the sleeve and thus eliminates friction and the possibility of lateral buckling, such as would occur in a compression spring, is avoided.

The spindle valve 19 may be freely rotated, or may rotate upon its seat 18, and its outer end may be formed for the reception of a device as a screw-driver inserted through the end 29 of the screw, the latter being provided with a removable plug 31 which closes the hollow screw and prevents leakage of the liquid under pressure therefrom.

The operation of the automatic throttle or valve 19 is as follows: When water under high pressure is admitted to the high pressure chamber P of the valve it tends to flow through the ducts 11 and 13 and enters the control chamber C, and will accumulate therein at a pressure which will equal the pressure of the spindle valve 19 upon its seat 18 when the water flows through the passageway 16 into the bypass chamber 17, and when the pressure in the latter chamber equals or approximately equals the pressure of the spindle valve 19 the latter will be balanced; and since the chamber 20 is directly open to the atmosphere through the discharge port 21, the chamber 20 will fill and the water will pass through the discharge port 21 to atmospheric pressure, so that the arbitrarily fixed pressure in the control chamber C will remain approximately equal to the pressure of the throttle spring upon the throttle valve 19. The operator may initially set the spindle valve 19 against the seat 18 with the desired force by turning the screw 25 at the head 29, and for determining the adjustment of the throttle valve 19 with the desired pressure upon the seat 18, the head 29 of the screw is provided with a worm 29', which is engageable with a gage rack 32, having gage marks 33 upon its upper surface, the rack sliding out of the casing 2 as the screw 25 is turned and the pressure of the spring 24 increased. Conversely as the pressure of the throttle valve 19 upon the seat 18 is decreased by the relaxation of the spring 24, when the screw 25 is turned in the opposite direction the gage rack 32 will recede in the casing 2, the gage marks on the gage rack 32 being made of a pitch corresponding to the tension of the spring 24. The operation of the valve will then be as follows: Assuming that the valve body 2 has been connected by the swivel clamp ring 5 to the source of supply 6, and that the connections 3 and distributer pipes or hose 3', have been connected, these latter being provided with nozzle shut-off valves as 3ᵃ then when the pressure is admitted from the supply or hydrant 6 into the high pressure chamber P it will pass through the duct 11 into the counterbalancing chamber P' at the opposite end of the valve under the head 15, and will also flow through the ports 13 into the control chamber C and rise therein to equalize with the pressure of the throttle valve 19; whereupon the unbalanced pressure in the control chamber C will react against the face of the piston 14 and lift the valve 7 from its seat, so that water may enter the discharge chamber D and flow through the connections 3 and the hose 3', by which it is discharged.

Now, in the event that for any reason the pressure in the discharge chamber rises or falls, there will be a proportionate movement of the valve 7 determined as follows: Assuming that there is 200 pounds pressure in the high pressure chamber P of the valve body, and this, of course, being equalized in the chamber P', the valve 7 will be inert as to the high pressure, and with the throttle valve 19 subjected to a pressure by the spring 24, such as will produce the desired pressure, say 100 pounds in the discharge chamber, then the water will collect in the control chamber by flowing through the ducts 11 and 13, at a pressure approximately equaling the pressure of the throttle valve 19 on its seat 18, and hold the valve 7 open by reason of the unbalanced pressure of 100 pounds on the valve operating piston 14, and hold the valve 7 open to produce a similar pressure in the discharge chamber. If then one or the other, or both, of the hose lines 3' be entirely cut off, or the quantity of discharge from either, or both, be diminished, this would cause a momentary unbalanced back pressure in the discharge chamber 3, which being greater than the pressure in the control chamber C would act against the valve disk 7 to move the same toward its seat, thus diminishing the supply from the high pressure chamber P and bringing the pressure in the discharge chamber D down to the arbitrary selected pressure constantly maintained in the control chamber C by the automatically operating and arbitrarily varied pressure valve 19. Then suppose that the hose lines 3' be thrown fully open, the pressure in the discharge chamber D would then momentarily fall below the selected pressure of 100 pounds, and the unbalanced pressure of 100 pounds in the control chamber C would react against the piston 14 and move the latter outwardly, thus increasing the volume coming into the chamber D and causing recovery of equilibrium of pressures between the discharge chamber D and the control chamber C; whereupon the movement of the piston and the valve 7 by the actuating unbalanced pressure in the control chamber C would cease; and so long as the pressure in the discharge connections from the chamber D remains equal to the arbitrarily fixed pressure in the control chamber C, then there will be no movement of the valve 7.

From the foregoing it will be seen that this valve does not depend upon and has no relation to the action which would be produced by leakage of fluid past the reciprocating piston 14, the valve being controlled entirely by the automatically operating variably adjustable throttle valve 19.

If the diameter of the piston 14 and the area of the opening of the valve seat 4 be substantially equal, when it should then be desired to reduce the pressure in the discharge chamber to a very low minimum with relation to the high pressure at the source; then because of the friction of the moving piston with the sides of the body the valve 7 might not be movable with sufficient sensitiveness to produce this very low minimum, or may not be able to close entirely when the latter is desired. Therefore, to overcome frictional resistance so that the valve 7 may move down to produce a very low minimum as to the high pressure, and also to accomplish the substantial closing of the valve disk 7 on its seat when desired, I have shown the piston 14 as provided with a circumferential flange or diametral enlargement, as at 14', running in a chamber 33 formed between it and the cap 15; said chamber communicating through a passageway or duct 34 with the lower portion of the discharge chamber D, so that water will accumulate in the chamber 33 behind the enlargement 14' or flange of the piston 14 at the same pressure as is in the discharge chamber. The slight circumferential enlargement 14' of the area of the piston 14, which is subjected to the counterbalancing pressure in the chamber $p'$, will be sufficient to aid in conjunction with the unbalanced pressure on the discharge side of the valve disk 7, to close the same downwardly to maintain a low minimum pressure in the discharge against the high pressure in the pressure chamber P.

It is understood that I may construct the piston 14 with an area substantially equal to the inlet area of the valve seat, and may or may not use the circumferential enlargement 14'; or again I may make the area of the piston 14 of any suitable proportion with relation to the inlet area of the valve seat 14, so that the ratio of the supply and discharge pressures would be proportional to the areas of the piston 14 and the inlet area of the valve, in the latter case the throttle 19 being adjustable to produce arbitrarily predetermined pressures varying as between the maximum and minimum discharge pressures or to entirely shut off, as determined by the ratio existing between the pressure-actuated piston 14 and the area of the inlet opening of the valve.

Owing to the possibility of foreign substances entering the valve structure with the moving fluid, and thus preventing the free movement or closing of the valve disk 7, or the closing of the throttle valve 19, or its movement, it is desirable that manually operable means be provided whereby the valve disk 7 may be forcibly opened irrespective of the operation of the throttle 19; or may be forcibly or positively closed irrespective of the throttle, and to accomplish these functions there is shown with relation to the by-pass chamber 17 a relief cock 35, which may be and is normally turned to cut off the relief port 17 which extends to the atmosphere at one side when the valve is operating normally and under the control of the throttle 19; and in the event that the throttle fails to properly operate then the relief cock 35 will be thrown to open the relief or bypass 17, so that water or fluid from the control chamber C will flow directly to the atmosphere through the relief cock 35, and the pressure in the control chamber C, thus be entirely released, and the valve disk 7 closed by the unbalanced pressure in the discharge chamber. So long as the relief cock 35 is closed then the desired arbitrary fixed pressure will be maintained in the control chamber C, through the medium of the automatic throttle 19.

While the relief cock 35 provides for the closing of the valve disk 7 by the discharge pressure, irrespective of the operation of the throttle 19, another cock 36, Fig. 2, is mounted in the casing and controls the flow of fluid through a passageway or duct 37, which opens at one end into the high pressure chamber P, and at its opposite portion on the other side of the cock 36 enters the bypass chamber 17 intermediately between the valve seat 18 and the shut-off cock 35. The cock 36 is provided, as shown in Fig. 4, with a large port 38, from which extend smaller different sized ports 39, the port 38 being turnable into register with the pressure side of the duct 37, the fluid passing through one or the other of the smaller ports 39 and continuing past the valve into the intermediate or bypass chamber 17, thence flowing downwardly through the passageway 16 and entering the regulating chamber C where it may back up with a pressure equal to the pressure in the supply chamber P if the throttle 19 be seated hard, and being unbalanced in the chamber C will operate upon the piston 14 to shift the latter outwardly and thus raise the valve disk 7 from its seat or fully open the valve, this being accomplished irrespective of the operation of the throttle 19, which, if desired, may be held down against its seat 18 by increasing the pressure through means of the spring 24.

Since the ports 39 may also become clogged by substances in the fluid flowing into the large port 38, by simply reversing the position of the cock 36 so that its ports 39 are turned into register with the pressure side of the channel 37, then the full force of the pressure on these ports would force the clogging substances backwardly into the larger chamber 38, through which they can be carried away to the discharge 22.

Thus it will be seen that in the event of the non-operation of the throttle valve 19, so that a constant flow passes the same to the exhaust 22, thereby failing to control the movement of the valve disk 7, as soon as the operator's attention was drawn to the fact he could throw the cock 36 to open communication between the high pressure chamber P and the passageway 37—16, and thence into the control chamber C; whereupon the high pressure accumulating in the chamber C would open the valve fully, so that the pressures in the high pressure chamber and the discharge chamber could equalize and give the maximum pressure discharge from the valve.

The purpose of providing distributer ports 39 of different areas in the opening cock 36 is to compensate for the different volume of flow past the throttle valve 19 due to the wear of the latter, or other causes which would permit a large or small volume to discharge past the valve 19 and through the escape tube 22.

The valve 7 may be mechanically and positively closed when desired by means of a force screw or other suitable means 40, turnable in and extending through the cap 15, the inner end of the force screw 40 being engageable with and adapted to force down the valve stem 8 and seat the valve disk positively on its seat 4. Preferably the valve when adjusted in relation to a source of supply will assume a horizontal position as to its connections 3 and thereby allow air to collect in the upper portion of the control chamber C, this air acting as a cushion which would react upon the liquid contained in the chamber C and thus cause the piston 14 and the stem 8 of the valve to have a constant although slight vibratory movement with relation to their bearing surfaces, and tend to prevent the sticking of parts.

It is understood that the valve can be operated and controlled by either the fluid passing through the ports 13 or through the valve 36, as when either of the ports should become clogged.

The valve may have a plurality of discharge connections as hose 3'. Should it be desired to cut off one or more and still supply others, as in the emergency that a hose should burst, I provide in the combination, auxiliary cocks or valves 45 for each discharge connection.

Fig. 5 shows a relief cock 36' which may be utilized in place of cock 36. This cock has three-way ports affording communication either from P to C through 37 and 17 or from C to the atmosphere at the outlet 37'. When valve 36' is utilized the cock 35 may be eliminated.

The subject-matter—including the feature of air cushioning, the fluid operated piston and its control chamber, the compartment communicating with the discharge chamber and structure common to both,—disclosed in this specification and drawing but not claimed is claimed by my prior application filed March 3, 1913, Ser. No. 751,749.

Having thus described my invention what I claim and desire to secure by Letters Patent is:

1. An automatically operating pressure reducing valve having a high pressure chamber, a discharge chamber adapted to communicate with the high pressure chamber, a valve disk movable in the discharge chamber for controlling the flow of fluid from the high pressure to the discharge chamber, and a chamber in free communication with the high pressure chamber for containing a fluid at arbitrarily selected and constant pressure for operating the valve disk to maintain a predetermined discharge pressure at the valve, the movable valve member having equal areas exposed to the high pressure.

2. An automatically operating pressure reducing valve having a high pressure chamber, a discharge chamber adapted to communicate with the high pressure chamber, a balanced valve disk controlling the flow of fluid from the high pressure to the discharge chamber and operating in the latter, and a chamber in free communication with the high pressure chamber for containing a fluid at arbitrarily selected and constant pressure for operating the valve disk to maintain a predetermined discharge pressure at the valve, the movable valve member having equal areas exposed to the high pressure.

3. An automatically operating pressure reducing valve having a high pressure chamber, a discharge chamber adapted to communicate with the high pressure chamber, a balanced valve disk movable in the discharge chamber for controlling the flow of fluid from the high pressure to the discharge chamber, and a chamber for containing a fluid at arbitrarily selected and constant pressure for operating the disk to maintain a predetermined discharge pressure at the valve, said controlling pressure chamber freely communicating with the high pressure chamber and discharging to the atmosphere, the movable valve member having equal areas exposed to the high pressure.

4. An automatically operating pressure reducing valve having a high pressure chamber, a discharge chamber adapted to communicate with the high pressure chamber, a valve disk operating in the discharge chamber for controlling the flow of fluid from the high pressure to the discharge chamber, a chamber in free communication with the high pressure chamber for containing a fluid at arbitrarily selected and constant pressure for operating the valve disk to maintain a predetermined discharge pressure at the valve, and an automatically operable arbitrarily adjustable throttle for maintaining a predetermined pressure in the control pressure chamber, the movable valve member having equal areas exposed to the high pressure.

5. An automatically operating pressure reducing valve, including a valve body with a high pressure chamber connectible to a source of supply, a discharge chamber with discharge connections, a valve disk in the discharge chamber for controlling the flow of fluid from the high pressure to the discharge chamber, said valve disk being balanced against the high pressure, and a chamber in the valve casing in free communication with the high pressure chamber for constantly maintaining a liquid under a predetermined pressure whereby variations of pressure in the discharge chamber will be rectified by the automatic operation of the valve, the movable valve member having equal areas exposed to the high pressure.

6. An automatically operable valve comprising an inlet and discharge chamber and a valve disk controlling flow therethrough, said valve being balanced by pressure equal to and against high pressure at the inlet side, and means for constantly maintaining a predetermined arbitrary pressure in the discharge side, said means comprising a control chamber freely communicating with the inlet side of the valve and separated therefrom by the discharge chamber and having adjustable means for determining the pressure of the fluid in the control chamber, and a part exposed to the pressure of the fluid in said chamber for controlling the movement of the valve disk, the movable valve member having equal areas exposed to the high pressure.

7. An automatically operable valve comprising an inlet and discharge chamber and a valve disk controlling flow therethrough, said valve being balanced against high pressure at the inlet side, and means for constantly maintaining a predetermined arbitrary pressure in the discharge side, said means comprising a control chamber communicating with the inlet side of the valve and having adjustable automatic means for determining the pressure of the fluid in said control chamber, and a part exposed to the pressure of fluid in said chamber for controlling the movement of the valve disk, and means for instantly relieving the pressure in the control chamber irrespective of the aforesaid pressure controlling means when opened.

8. An automatically operable valve comprising an inlet and discharge chamber and a valve disk controlling flow therethrough, said valve being balanced against high pressure at the inlet side, means for constantly maintaining a predetermined arbitrary pressure in the discharge side, said means comprising a control chamber communicating with the inlet side of the valve and having adjustable automatic means for determining the pressure of the fluid in the control chamber, a part exposed to the pressure of fluid in said chamber for controlling the movement of the valve disk, means for instantly relieving the pressure in the control chamber irrespective of the aforesaid pressure controlling means when opened, and a device whereby high pressure can be turned into the control chamber from the high pressure side of the valve for raising the valve disk independently of the automatically operating pressure controlled means.

9. An automatically operable valve comprising an inlet and discharge chamber and a valve disk controlling flow therethrough, said valve being balanced against high pressure at the inlet side, means for constantly maintaining a predetermined arbitrary pressure in the discharge side, said means comprising a control chamber communicating with the inlet side of the valve and having adjustable automatic means for determining the pressure of the fluid in the control chamber, a part exposed to the pressure of fluid in said chamber for controlling the movement of the valve disk, means for instantly relieving the pressure in the control chamber irrespective of the aforesaid pressure controlling means when opened, and a device whereby high pressure can be turned into the control chamber from the high pressure side of the valve for raising the valve disk independently of the automatically operating pressure controlled means, whereupon the valve disk will be automatically opened by the unbalanced pressure on the discharge side.

10. An automatically operating pressure reducing valve with a suitable casing, including means on the inlet side for attachment to a source of supply, a discharge chamber and its connections, a valve member interposed in the discharge chamber and constantly balanced against the pressure in the inlet side, and a control pressure chamber in free communication with the inlet side, in which is movable a part attached to the valve member subjected to arbitrarily predetermined pressure whereby the part can be moved to shift the valve member to maintain in the discharge chamber an approximately even predetermined pressure substantially equal to that in the pressure controlled chamber, a wall of the casing separating the discharge side from the control side, and a stem bearing in the wall and connecting the valve member and said part.

11. An automatically operating pressure reducing valve with a suitable casing, including means on the inlet side for attachment to a source of supply, a discharge chamber and its connections, a valve member operable in the discharge chamber and constantly balanced against the pressure in the inlet side, and a control pressure chamber provided for free communication with the inlet side, in which is movable a part attached to the valve member subjected to arbitrarily predetermined pressure whereby the part can be moved to shift the valve member to maintain in the discharge chamber an approximately even predetermined pressure substantially equal to that in the pressure controlled chamber, and an automatically operable arbitrarily adjustable throttle for controlling the degree of pressure in the control chamber, a wall of the casing separating the discharge side from the control side, and a stem bearing in the wall and connecting the valve member and said part.

12. An automatically operating pressure reducing valve, comprising a suitable casing with an inlet high pressure chamber connectible to a source of supply, a discharge chamber and its connections, a valve member for controlling flow of fluid from one to the other, and a pressure control chamber between which and the high pressure chamber the discharge chamber is interposed in which is operable a part connected to said valve member, said chamber being in communication with the high pressure side of the valve and opening to the atmosphere, and an automatically operating variable pressure throttle valve interposed between the control chamber and its discharge to the atmosphere whereby fluid may be maintained at a predetermined pressure in said chamber, the valve member being automatically operable by variations of pressure in the discharge chamber and said control chamber, a wall of the casing separating the discharge side from the control side, and a stem bearing in the wall and connecting the valve member and said part.

13. An automatically operating pressure reducing valve, comprising a suitable casing with an inlet high pressure chamber connectible to a source of supply, a discharge chamber and its connections, a valve member for controlling flow of fluid from one to the other, and a pressure control chamber between which and the high pressure chamber the discharge chamber is interposed, in which is operable a part connected to said valve member, said chamber being in communication with the high pressure side of the valve and opening to the atmosphere, and, an automatically operating variable pressure throttle valve interposed between the control chamber and its discharge to the atmosphere whereby fluid may be maintained at a predetermined pressure in said chamber, the valve member being automatically operable by variations of pressure in the discharge chamber and said control chamber, said valve member being balanced by pressure at its opposite end equal to and against the high pressure in the inlet chamber of the valve.

14. A valve for maintaining a constant arbitrary pressure at its discharge side, comprising a casing connectible to a source of supply and having a valve seat, a valve disk movable in the discharge chamber toward and from said seat, a wall in the casing separating the discharge from and forming a control chamber, means providing for direct communication between the high pressure chamber and the control chamber, and means operative by variations of pressure in the control chamber for actuating the valve disk.

15. A valve for maintaining a constant arbitrary pressure at its discharge side, comprising a casing connectible to a source of supply and having a valve seat, a valve disk movable in the discharge chamber toward and from said seat, a wall in the casing separating the discharge from and forming a control chamber, means providing for direct communication between the high pressure chamber and the control chamber, means operative by variations of pressure in the control chamber for actuating the valve disk, and a chamber for pressure operative upon the valve disk to balance it against the high pressure.

16. A pressure controlling valve comprising in combination, a casing with coaxial, high pressure chambers at opposite ends and having a valve seat, a discharge chamber interposed between said high pressure chambers, a valve member movable in said discharge chamber toward and from the seat, a control chamber between said discharge chamber and the balancing chamber, and means for maintaining a pressure effective upon the valve member to actuate the same for producing the desired discharge pressure.

17. A pressure controlling valve, comprising a casing with a discharge chamber and a supply connection therefor, and having an arbitrarily variable pressure or control chamber, and having also a compartment communicating freely with the discharge chamber, a valve member with a part movable in the discharge chamber to control the inlet flow, and having a part movable in the control chamber and subject to pressure in said compartment, and means for balancing the high pressure against the inlet side of the valve.

18. A pressure controlling valve, comprising a casing with a discharge chamber and a supply connection therefor, and having an arbitrarily variable pressure or control chamber, and having also a compartment communicating freely with the discharge chamber, a valve member with a part movable in the discharge chamber to control the inlet flow, and having a part movable in the control chamber and subject to pressure in said compartment, and means for balancing the high pressure against the inlet side of the valve, the area of the valve member in the discharge chamber plus the area of its part subject to pressure in said compartment substantially equaling the area of said part subject to pressure in the control chamber.

19. A pressure controlling valve, comprising a casing with a discharge chamber and a supply connection therefor, and having an arbitrarily variable pressure or control chamber, and having also a compartment communicating freely with the discharge chamber, a valve member with a part movable in the discharge chamber to control the inlet flow, and having a part movable in the control chamber and subject to pressure in said compartment, and means for balancing the high pressure against the inlet side of the valve, the area of the valve member in the discharge chamber plus the area of its part subject to pressure in said compartment substantially equaling the area of said part subject to pressure in the control chamber, so that said valve member is balanced as to high pressure and to the pressure in the discharge chamber when this equals the pressure in the control chamber.

20. A pressure controlling valve, comprising a casing with an inlet high pressure chamber at one end and a high pressure chamber of similar area at the opposite end, a discharge chamber interposed therebetween, a valve disk movable in the discharge chamber to control the inflow, a chamber separate from the discharge chamber with means for maintaining a constant, arbitrary pressure, and means connected to the valve member and subject on one side to said arbitrary pressure and on the other side to the high pressure in the balancing chamber.

21. A valve for maintaining a constant arbitrary discharge pressure irrespective of variations of the supply pressure, which consists of a casing divided into two separate chambers, one of which includes supply and discharge compartments, and the other a control compartment and a balancing compartment, a valve member in the discharge compartment for controlling the inflow from the supply, and having a part projecting into the other chamber and subject to pressure in the balancing compartment equal to the supply pressure, and means for holding an arbitrary pressure in the control compartment for governing the movements of the valve member under variations of pressure occurring at the supply or at the discharge.

22. A valve for maintaining a constant arbitrary discharge pressure irrespective of variations of the supply pressure, which consists of a casing divided into two separate chambers, one of which includes supply and discharge compartments, and the other a control compartment and a balancing compartment, a valve member in the discharge compartment for controlling the inflow from the supply, and having a part projecting into the other chamber and subject to pressure in the balancing compartment equal to the supply pressure, means for holding an arbitrary pressure in the control compartment for governing the movements of the valve member under variations of pressure occurring at the supply or at the discharge, and means for instantly relieving the pressure in the control chamber.

23. A valve for maintaining a constant arbitrary discharge pressure irrespective of variations of the supply pressure, which consists of a casing divided into two separate chambers, one of which includes supply and discharge compartments, and the other a control compartment and a balancing compartment, a valve member in the discharge compartment for controlling the inflow from the supply, and having a part projecting into the other chamber and subject to pressure in the balancing compartment equal to the supply pressure, means for holding an arbitrary pressure in the control compartment for governing the movements of the valve member under variations of pressure occurring at the supply or at the discharge, and a device coöperative with said means whereby high pressure can be obtained in the control chamber for raising the valve.

24. In a pressure controlling valve, an inlet high pressure chamber and a discharge chamber communicating therewith, a valve disk in the latter for controlling inflow, a control chamber communicating through said control valve disk with the high pressure chamber, a relief duct for said chamber, an automatic check valve controlling flow through the duct, means including a turnable knob for arbitrarily varying the pressure of said check valve, and a gage bar actuated by said knob for approximately indicating the arbitrary pressure of said check valve.

25. In a pressure controlling valve, adjacent supply and discharge chambers, a valve disk interposed in the latter for controlling inflow, means for balancing the supply pressure against the valve disk, a chamber in which an arbitrary pressure may be maintained for controlling the movement of said disk, a duct leading from the arbitrary pressure chamber, an automatically operable, variable pressure relief valve controlling the flow through the duct, and an instantaneous, manually operable relief cock for the duct.

26. In a pressure controlling valve, adjacent supply and discharge chambers, a valve disk interposed in the latter for controlling inflow, means for balancing the supply pressure against the valve disk, a chamber in which an arbitrary pressure may be maintained for controlling the movement of said disk, a duct leading from the arbitrary pressure chamber, an automatically operable, variable pressure relief valve controlling the flow through the duct, an instantaneous, manually operable relief cock for the duct, and means for turning maximum pressure into said duct.

27. In a pressure controlling valve, adjacent supply and discharge chambers, a valve disk interposed in the latter for controlling inflow, means for balancing the supply pressure against the valve disk, a chamber in which an arbitrary pressure may be maintained for controlling the movement of said disk, a duct leading from the arbitrary pressure chamber, an automatically operable, variable pressure relief valve controlling the flow through the duct, an instantaneous, manually operable relief cock for the duct, and means for turning maximum pressure into said duct, said means including a by-pass duct with a control cock.

28. In a pressure controlling valve, adjacent supply and discharge chambers, a valve disk interposed in the latter for controlling inflow, means for balancing the supply pressure against the valve disk, a chamber in which an arbitrary pressure may be maintained for controlling the movement of said disk, a duct leading from the arbitrary pressure chamber, an automatically operable, variable pressure relief valve controlling the flow through the duct, an instantaneous, manually operable relief cock for the duct, and means for turning maximum pressure into said duct, said means including a by-pass duct with a control cock with varisized issue ports.

29. In a pressure controlling valve, adjacent supply and discharge chambers, a valve disk interposed in the latter for controlling inflow, means for balancing the supply pressure against the valve disk, a chamber in which an arbitrary pressure may be maintained for controlling the movement of said disk, a duct leading from the arbitrary pressure chamber, an automatically operable, variable pressure relief valve controlling the flow through the duct, an instantaneous, manually operable relief cock for the duct, and means for turning maximum pressure into said duct, said means including a by-pass duct with a control cock with varisized issue ports reversible in its duct to dislodge accumulated deposits from said ports.

30. In a valve for automatically maintaining an arbitrary discharge pressure, comprising a supply chamber and a discharge chamber, a valve disk controlling the flow therein, a control chamber in which an arbitrary pressure is maintained and which communicates with the high pressure chamber, and in which an air cushion is formed, and a member mounted in said control chamber for moving the valve disk, said air cushion providing for sensitiveness of the valve disk and its actuator to slight variations of pressure.

In testimony whereof I have hereunto set my hand in the presence of two subscribing witnesses.

WILLIAM H. GLEESON.

Witnesses:
JOHN H. HERRING,
W. W. HEALEY.

Copies of this patent may be obtained for five cents each, by addressing the "Commissioner of Patents, Washington, D. C."